(12) United States Patent
Nakano

(10) Patent No.: US 10,209,529 B2
(45) Date of Patent: *Feb. 19, 2019

(54) ILLUMINATION SYSTEM

(71) Applicant: PANASONIC INTELLECTUAL PROPERTY MANAGEMENT CO., LTD., Osaka (JP)

(72) Inventor: Yoshiyuki Nakano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/962,405

(22) Filed: Apr. 25, 2018

(65) Prior Publication Data
US 2018/0314072 A1 Nov. 1, 2018

(30) Foreign Application Priority Data
Apr. 28, 2017 (JP) ................... 2017-090118

(51) Int. Cl.
| | | |
|---|---|---|
| *F21V 7/04* | (2006.01) | |
| *G02B 27/09* | (2006.01) | |
| *G02B 27/10* | (2006.01) | |
| *H05B 33/02* | (2006.01) | |
| *F21V 8/00* | (2006.01) | |

(52) U.S. Cl.
CPC ....... *G02B 27/0994* (2013.01); *G02B 6/0005* (2013.01); *G02B 27/1006* (2013.01); *H05B 33/02* (2013.01)

(58) Field of Classification Search
None
See application file for complete search history.

(56) References Cited

U.S. PATENT DOCUMENTS 6,592,245 B1  7/2003  Tribelsky et al.

FOREIGN PATENT DOCUMENTS

| JP | 2001-512616 | 8/2001 |
| JP | 2005-090144 | 4/2005 |

*Primary Examiner* — Vip Patel
(74) *Attorney, Agent, or Firm* — Greenblum & Bernstein, P.L.C.

(57) ABSTRACT

An illumination system of an embodiment includes: a solid-state light source; a wavelength conversion element that converts a wavelength of light emitted from the solid-state light source; a light guide tube that allows incoherent light emitted from the wavelength conversion element to propagate and transmit therethrough, and that has a floating property to float in water; and a connection member that connects and retains the light guide tube on a road surface while securing the floating property of the light guide tube.

13 Claims, 6 Drawing Sheets

ILLUMINATION SYSTEM

INCORPORATION BY REFERENCE

The entire disclosure of Japanese Patent Application No. 2017-090118 filed on Apr. 28, 2017, including the specification, claims, drawings, and abstract, is incorporated herein by reference in its entirety.

TECHNICAL FIELD

The present disclosure relates to an illumination system.

BACKGROUND

Japanese Unexamined Patent Application Publication No. 2005-90144 discloses a road line drawing nighttime display device in which a line drawing such as a car lane line drawing, a direction instruction line drawing, a section line drawing, or the like is formed by placing a side-surface light emission optical fiber, providing a protection cover over the side-surface light emission optical fiber, and providing a light source opposing an incident end surface of the side-surface light emission optical fiber. Japanese Unexamined Patent Application Publication No. 2001-512616 discloses a method of optically marking an instruction route useful for traffic signs and signals, wherein a side-surface light emission optical fiber is provided along the instruction route.

SUMMARY

When a road surface is submerged due to high tide, flooding of rivers, or the like, it is important to make a boundary between the sea, river, or the like and the road surface visible, to consequently secure safety of pedestrians and drivers of automobiles or the like. An advantage of the present disclosure lies in provision of an illumination system in which a boundary between the sea, the river, or the like and the road surface is made visible while securing a waterproof property, during submergence of the road surface.

According to one aspect of the present disclosure, there is provided an illumination system comprising: a solid-state light source; a wavelength conversion element that converts a wavelength of light emitted from the solid-state light source; a light guide tube that allows incoherent light emitted from the wavelength conversion element to propagate and transmit therethrough and that has a floating property to float in water; and a connection member that connects and retains the light guide tube on a road surface or on a construction placed on the road surface while securing the floating property of the light guide tube.

Advantageous Effects of Invention

According to the illumination system according to one aspect of the present disclosure, during submergence of the road surface, the boundary between the sea, the river, or the like and the road surface can be easily viewed while a waterproof property is assured.

BRIEF DESCRIPTION OF DRAWINGS

The figures depict one or more implementations in accordance with the present teachings, by way of example only, not by way of limitations. In the figures, like reference numerals refer to the same or similar elements.

Embodiment(s) of the present disclosure will be described based on the following figures, wherein.

DETAILED DESCRIPTION

Figure 1:
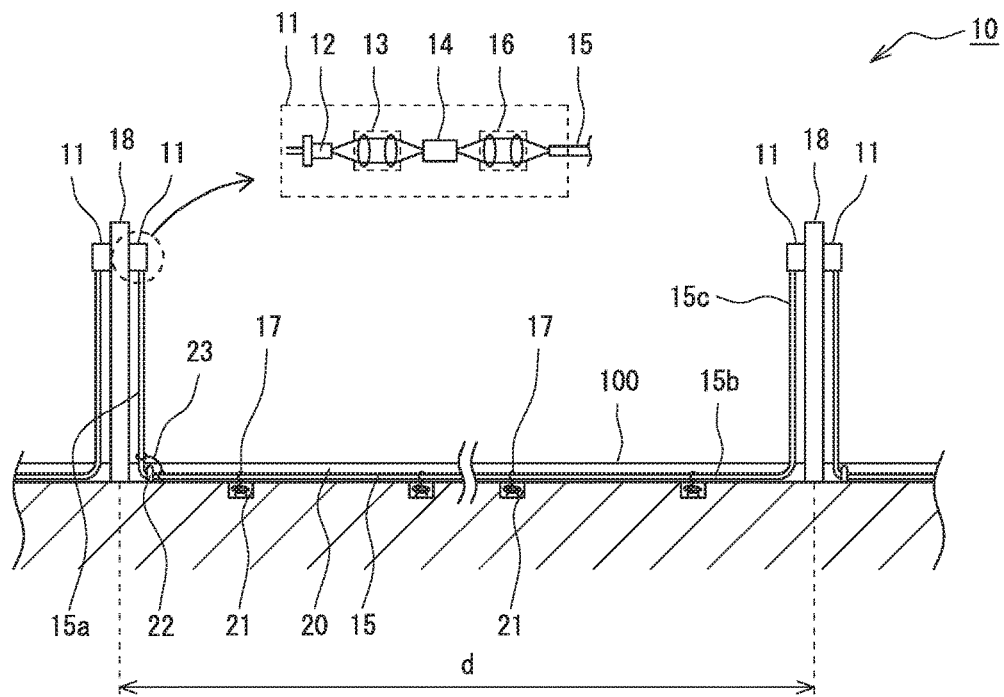
FIG. 1 is a diagram showing an illumination system according to one configuration of an embodiment of the present disclosure, which shows a state where a light guide tube is stored in a receiving groove.

Example configurations of an illumination system according to an embodiment of the present disclosure will now be described in detail with reference to the drawings. It should be noted that selective combination of constituting elements of a plurality of embodiments described below is conceived of from the start. In addition, the drawings referred to in the description of the embodiment are schematically drawn, and a size ratio of the constituting elements drawn in the drawings or the like should be determined in consideration of the following description.

In the present embodiment, cases are exemplified in which a light guide tube of the illumination system is placed along an edge of a road extending along a bank of a river (bank road), and along an edge of a pier of a harbor, but the placement locations of the illumination system are not limited to these. The light guide tube of the illumination system of the present disclosure may be placed, for example, along a water discharge channel, an irrigation canal, a gutter, or the like which does not have a bank, or along a seashore, a lakeshore, a pond edge or the like. Alternatively, the light guide tube may be placed at any location where it becomes difficult to identify an edge of the road during submergence (for example, roads around which farms, swamps, or the like exist).

In addition, in the present embodiment, cases are exemplified in which a connection member which connects and retains the light guide tube is fixed on a paved road surface 100, but alternatively, the connection member may be fixed on a construction placed on the road surface. As the construction, curbstones placed at an edge of a road, a sidewalk, a harbor, or the like may be exemplified. In the present specification, a road surface means all types of grounds on which humans and vehicles such as automobiles can pass.

Figure 2:
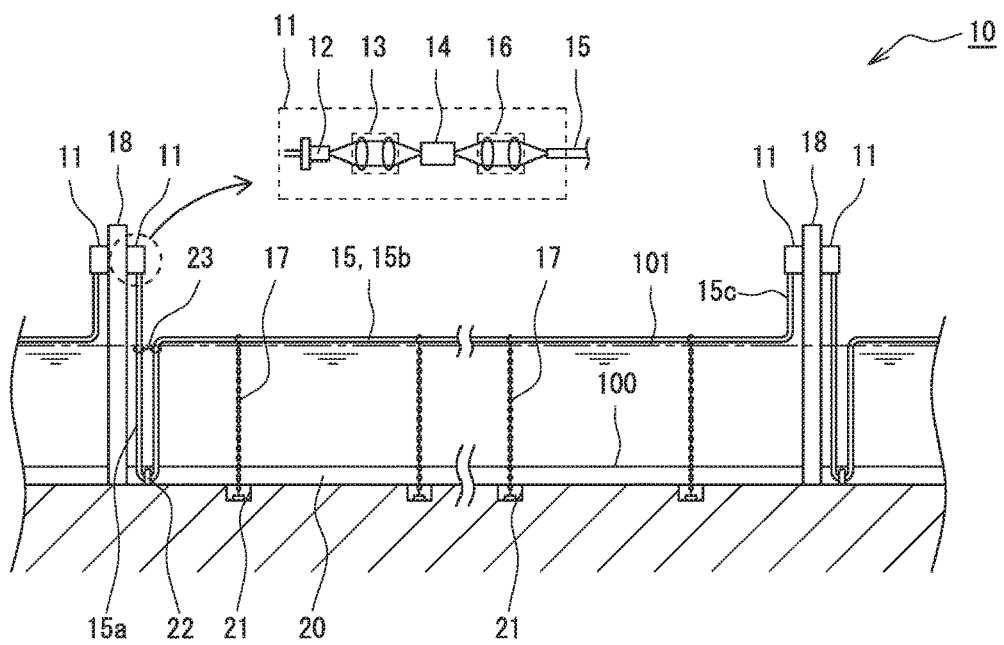
FIG. 2 is a diagram showing the illumination system according to one configuration of the embodiment of the present disclosure, which shows a state where the light guide tube floats on a water surface.

FIGS. 1 and 2 show an illumination system 10 according to one configuration of the present embodiment. As shown in FIGS. 1 and 2, the illumination system 10 comprises a solid-state light source 12, a wavelength conversion element 14 which converts a wavelength of light emitted from the solid-state light source 12, and a light guide tube 15. The light guide tube 15 allows incoherent light emitted from the wavelength conversion element 14 to propagate and transmit therethrough, and has a floating property to float in water. In addition, the illumination system 10 comprises a connection member 17 which connects and retains the light guide tube 15 on the road surface 100 while securing the floating property of the light guide tube 15.

In the illumination system 10, light which is emitted from the solid-state light source 12 is introduced to the light guide tube 15 through the wavelength conversion element 14 and from an end surface of the light guide tube 15, and the light guide tube 15 is configured to emit light over its entire length. The light guide tube 15 is placed at an edge of the road surface 100, and near a boundary with the sea, the river, or the like. Ordinarily, when the road surface 100 is not submerged, the light guide tube 15 is placed in a state of contacting the road surface 100, for example, in order to not obstruct passage or the like or not to adversely affect scenery. On the other hand, during submergence of the road surface 100, the light guide tube 15 floats on a water surface 101 and emits light, so that the boundary between the sea, the river, or the like and the road surface 100 can be easily viewed.

The illumination system 10 is lighted at least when the road surface 100 is submerged and the light guide tube 15 floats. The illumination system 10 may comprise a sensor which detects floating of the light guide tube 15, and a control apparatus which lights the solid-state light source 12 based on detection information of the sensor. In this case, the solid-state light source 12 may be caused to blink. Alternatively, the illumination system 10 may comprise a luminosity sensor which detects brightness of the surrounding environment and may light the solid-state light source 12 when the surrounding environment becomes dark regardless of whether or not the road surface 100 is submerged, based on the detection information of the sensor.

The illumination system 10 comprises a light source device 11 in which the solid-state light source 12 and the wavelength conversion element 14 are built in. The light source device 11 further comprises optical members 13 and 16 which are built therein. The optical member 13 is placed between the solid-state light source 12 and the wavelength conversion element 14, and is formed from, for example, a collimator lens which makes the light emitted from the solid-state light source 12 into parallel light, and a focusing lens which focuses the parallel light and introduces the focused light into the wavelength conversion element 14. The optical member 16 is placed between the wavelength conversion element 14 and the end surface of the light guide tube 15, and may be formed from a collimator lens and a focusing lens, similar to the optical member 13.

As the solid-state light source 12, a light emitting diode (LED), an organic EL (OEL), a semiconductor laser, or the like may be exemplified. In the illumination system 10, it is sufficient that the light introduced into the light guide tube 15 is incoherent light. The solid-state light source 12 may emit the incoherent light, but desirably, coherent light emitted from the solid-state light source 12 is converted into the incoherent light by the wavelength conversion element 14. A desirable solid-state light source 12 is a semiconductor laser, and semiconductor lasers which emit near-ultraviolet rays or blue light are particularly desirable.

The wavelength conversion element 14 converts, for example, the wavelength of the coherent light which is emitted from the semiconductor laser and introduced through the optical member 13, and emits the incoherent light. For the wavelength conversion element 14, fluorescent substances which are known in the related art may be employed. The wavelength conversion element 14 desirably converts the near-ultraviolet ray or the blue light from the semiconductor laser into white light. The incoherent light emitted from the wavelength conversion element 14 is introduced into the light guide tube 15 through the optical member 16 and from the end surface of the light guide tube 15.

Desirably, two solid-state light sources 12 and two wavelength conversion elements 14 are provided for each light guide tube 15, and the incoherent light is introduced from both end surfaces of the light guide tube 15. With such a configuration, it becomes easier to emit bright light over the entire length of the light guide tube 15. In the present embodiment, the light source device 11 is provided at each of the ends in the length direction of the light guide tube 15. The light source device 11 is desirable placed at a position higher than the road surface 100 so that the light source device 11 is not submerged during submergence of the road surface 100.

The illumination system 10 comprises a plurality of support pillars 18 placed with a spacing therebetween along the length direction of the light guide tube 15. In this case, the light guide devices 11 each including the solid-state light source 12 and the wavelength conversion element 14 are placed at positions higher than a maximum floating height of the light guide tube 15 at the support pillars 18. By providing the support pillars 18 and placing the light source devices 11 at a height where the light source devices 11 are not submerged, damage, electricity leakage, or the like of the light source device 11 due to submersion can be prevented.

The support pillar 18 is desirably provided at a position corresponding to the ends of the light guide tube 15 in the length direction. In other words, one light guide tube 15 is provided across two support pillars 18. The support pillar 18 may be dedicated equipment for the illumination system 10, or may be realized by a utility pole or the like. For example, an existing utility pole may be used as the support pillar 18. A spacing d between the support pillars 18 and a length of one light guide tube 15 are not particularly limited, but are desirably about 20 m~150 m apart.

The support pillar 18 has, for example, a length of greater than or equal to 1 m, and is provided in a standing manner approximately perpendicular with respect to the road surface 100. In the example configuration shown in FIGS. 1 and 2, two light source devices 11 are placed at an upper part of one support pillar 18. On one support pillar 18, two light guide tubes 15 are attached, and the light guide tubes 15 are provided extending in opposite directions from each other. Ordinarily, the light guide tube 15 is provided in a state in which the ends in the length direction extend in the vertical direction along the support pillar 18 and the remaining portions contact the road surface 100. As will be descried in detail later, a large portion of the light guide tube 15 is normally stored in a receiving groove 20 provided on the road surface 100.

Figure 3:
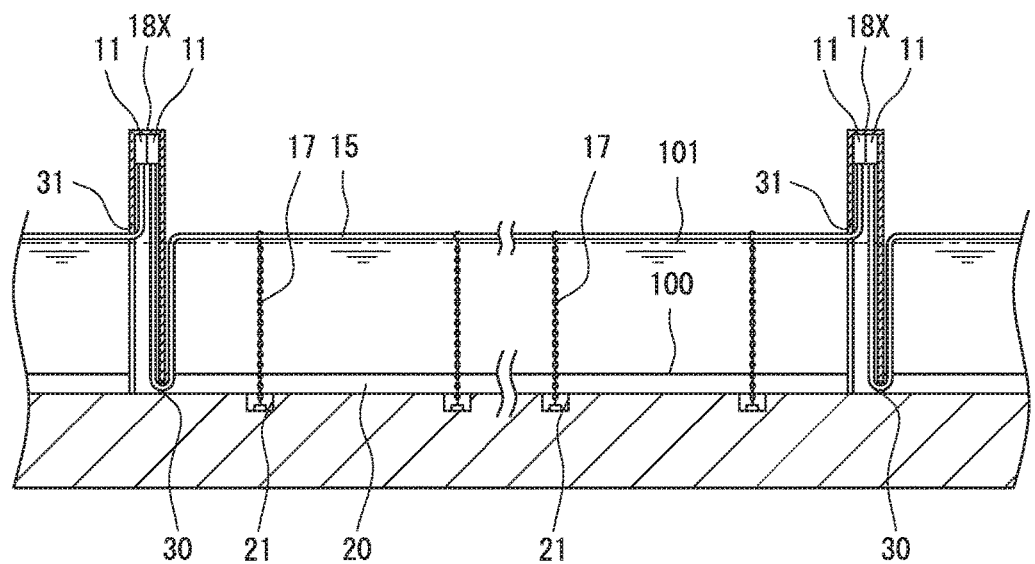
FIG. 3 is a diagram showing an alternative configuration of a support pillar.

As exemplified in FIG. 3 (which shows a state where the light guide tube 15 floats on a water surface 101), an inside of a support pillar 18X may be hollow, and the light source device 11 may be placed in the support pillar 18X. In this case, because the light source device 11 is not exposed to the weather, damage to the light source device 11 can be suppressed. Because the inside of a typical utility pole is hollow, it is possible to provide the light source device 11 inside the utility pole. In the example configuration of FIG.

3, the two light source devices 11 are placed inside and at an upper part of the support pillar 18X.

At a lower part of the support pillar 18X, an opening 30 through which the light guide tube 15 extends is formed. In addition, on the lower part of the support pillar 18, in order for the light guide tube 15 to float during submergence of the road surface 100, a slit 31 which extends along a length direction of the support pillar 18X is formed. The light guide tube 15 floats and sinks along the slit 31 with an increase or a decrease in the amount of water. In each support pillar 18X, the opening 30 for letting one light guide tube 15 pass through and the slit 31 for letting another light guide tube 15 pass through are formed, but alternatively, the slit 31 may be formed in place of the opening 30.

Alternatively, an engagement member which connects the light guide tube 15 and the support pillar 18X may be provided at an outer side of the opening 30, and a guiderail which holds the engagement member in a movable manner along the length direction may be provided on the support pillar 18X. The engagement member has a similar function to that of an engagement member 23 to be described later.

As described above, the incoherent light emitted from the wavelength conversion element 14 is introduced from both end surfaces of the light guide tube 15 and into the light guide tube 15. The incoherent light introduced into the light guide tube 15 propagates along the length direction, and a portion thereof transmits through the light guide tube 15 and is irradiated to the outside. By introducing the light from both end surfaces of the light guide tube 15, it becomes easier to secure brightness over the entire length of the light guide tube 15.

The light guide tube 15 comprises, for example, a core and a clad. The incoherent light emitted from the wavelength conversion element 14 is introduced into the core of the light guide tube 15, and propagates along the length direction through the core while being reflected at the boundary surface with the clad. The light guide tube 15 is configured to let a portion of the incoherent light introduced from the end surface transmit to the outside. Therefore, it is possible to emit light from the entirety of the light guide tube 15 by introducing light from both end surfaces of the light guide tube 15.

In the light guide tube 15, a surface of the clad is desirably coated with a resin. The resin has a function to protect the light guide tube 15 and improve endurance, and is formed from a transparent resin which transmits or which diffuses and transmits the light introduced into the light guide tube 15. A thickness of the light guide tube 15 is not particularly limited.

The light guide tube 15 has a floating property to float on the water surface 101 during submergence of the road surface 100. In other words, the density of the light guide tube 15 is smaller than the density of water. Because the light guide tube 15 is connected and retained to the road surface 100 by the connection member 17, when a weight of the connection member 17 acts on the light guide tube 15, the density of the light guide tube 15, including the weight of the connection member 17, must be set smaller than the density of water.

As described above, the connection member 17 is a member for connecting and retaining the light guide tube 15 on the road surface 100. The connection member 17 has one end fixed to the road surface 100 and the other end fixed to the light guide tube 15. For the connection member 17, for example, a chain or a string is used. By providing the connection member 17, it becomes possible to prevent carrying away of the light guide tube 15 floating on the water surface 101, and to make the boundary between the river or the like and the road surface 100 visible.

Figure 4:
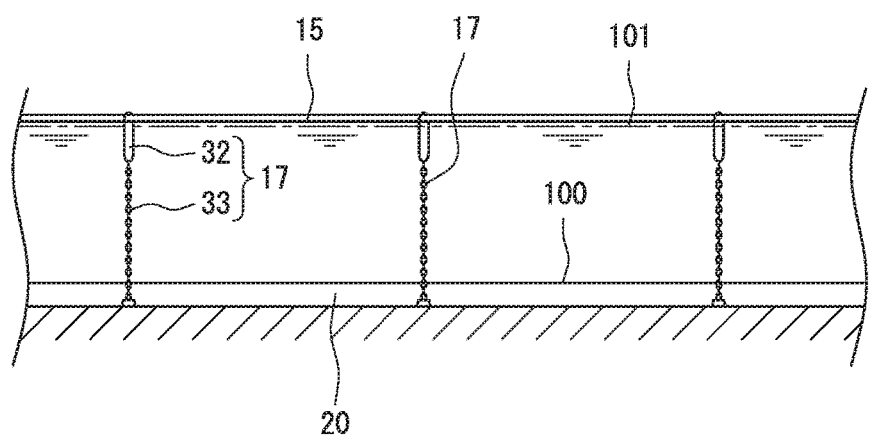
FIG. 4 is a diagram showing an alternative configuration of a connection member.

The chain which forms the connection member 17 may be made of either metal or a resin so long as there is no problem regarding endurance or the like, and the floating property of the light guide tube 15 is not adversely affected, and the chain itself may have a floating property to float in water. As exemplified in FIG. 4, the chain which forms the connection member 17 may be formed from two ring-shaped components 32 and 33. In the example configuration of FIG. 4, a ring-shaped component 32 having a large inner size is attached to the light guide tube 15. In this case, when the water on the road surface 100 recedes, it becomes easier for the floated light guide tube 15 to return to the original position (for example, in the receiving groove 20).

A plurality of the connection members 17 are desirably placed with a spacing therebetween along the length direction of the light guide tube 15. The plurality of connection members 17 are placed, for example, with equal spacing along the length direction of the light guide tube 15. An example of a placement spacing of the connection members 17 is 2 m~10 m. One end of the connection member 17 is fixed to not move with respect to the road surface 100, but for the other end of the connection member 17, it is sufficient that the other end is connected to the light guide tube 15, and a connecting portion between the light guide tube 15 and the connection member 17 may be movable along the length direction of the light guide tube 15.

The length of the connection member 17 is, for example, shorter than a height from the light source device 11 placed on the support pillar 18 to the road surface 100. A maximum floating height of the light guide tube 15 is defined by the lengths of the light guide tube 15 and the connection member 17. An example of the length of the connection member 17 is 0.3 m~1 m.

The illumination system 10 desirably comprises the receiving groove 20 of the light guide tube 15 provided on the road surface 100. The receiving groove 20 is a groove in which the light guide tube 15 is stored during normal operation when the road surface 100 is not submerged, and is provided extending along the length direction of the light guide tube 15. By providing the receiving groove 20 and storing the light guide tube 15 therein, during normal operation, the light guide tube 15 does not obstruct the passage or the like, and damage or the like of the light guide tube 15 tend to occur less frequently. The receiving groove 20 may be provided on a construction placed on the road surface 100. When the receiving groove 20 is provided, one end of the connection member 17 is fixed in the receiving groove 20.

The receiving groove 20 is formed continuously without a break over two support pillars 18. The receiving groove 20 may alternatively be formed in a length over three or more support pillars 18. The receiving groove 20 is formed in a width wider than the thickness of the light guide tube 15, and in a depth to allow storage of the entirety of the portions of the light guide tube 15 placed along the road surface 100 without the light guide tube 15 projecting to the outside. The receiving groove 20 is desirably formed in a size which also allows storage of the connection member 17.

A recess 21 for storing the connection member 17 may be formed in the receiving groove 20. Desirably, a plurality of the recesses 21 are provided on a bottom of the receiving groove 20, corresponding to the placement locations of the connection members 17. The recess 21 is a dented portion formed on the bottom of the receiving groove 20. By providing the recess 21 in this manner, it becomes possible to efficiently store the connection member 17 by minimizing the depth and the width of the receiving groove 20.

In the present embodiment, the light guide tube 15 having a longer length than the spacing d between the support pillars 18 is used. At the time of normal operation exemplified in FIG. 1, the light guide tube 15 is provided in a state where both ends in the length direction extend in the vertical direction along the support pillar 18, and the remaining portions are stored in the receiving groove 20 of the road surface 100. Thus, the length of the light guide tube 15 is longer than the spacing d by the lengths of one end 15a and the other end 15c extending in the vertical direction along the support pillar 18. A length of an intermediate portion 15b which is the remaining portion of the light guide tube 15 is approximately equal to the spacing d.

During the submergence of the road surface 100 exemplified in FIG. 2, the light guide tube 15 is placed such that the intermediate portion 15b floats on the water surface 101, and in a manner to approximately straightly connect, for example, two support pillars 18. Further, during the submergence of the road surface 100, at least one of the one end 15a and the other end 15c of the light guide tube 15 floats on the water surface 101. By setting the length of the light guide tube 15 to be longer than the spacing d and allowing at least one of the one end 15a and the other end 15c to float on the water surface 101, it becomes possible to place the light source device 11 at a height which is not submerged, and to secure the floating property of the light guide tube 15.

A part of the light guide tube 15 may be fixed on the road surface 100 so as to not float, by a fastening unit 22. In the present embodiment, the fastening unit 22 which fixes the boundary portion between the one end 15a and the intermediate portion 15b in the receiving groove 20 is provided, to prevent floating of the one end 15a. Because the connecting portion between the light guide tube 15 and the connection member 17 can move in the length direction of the light guide tube 15, in this case, the intermediate portion 15b and the other end 15c float on the water surface 101 while moving toward the side of the one end 15a. In this case, a margin portion which is longer than the spacing d when the light guide tube 15 is in the floated state on the water surface 101 is reduced, and, for example, the boundary between the sea, the river, or the like and the road surface 100 can be more accurately shown. In addition, it becomes easier for the light guide tube 15 to return to the receiving groove 20 when the water recedes.

Moreover, the engagement member 23 which connects the one end 15a and the intermediate portion 15b positioned at both sides of the fastening unit 22 may be provided. The engagement member 23 has, for example, a floating property to float in water, and floats and sinks together with the intermediate portion 15b during submergence of the road surface 100. Alternatively, the fastening unit 22 and the engagement member 23 may be provided at a central portion in the length direction of the light guide tube 15 (intermediate portion 15b).

Figure 5A:
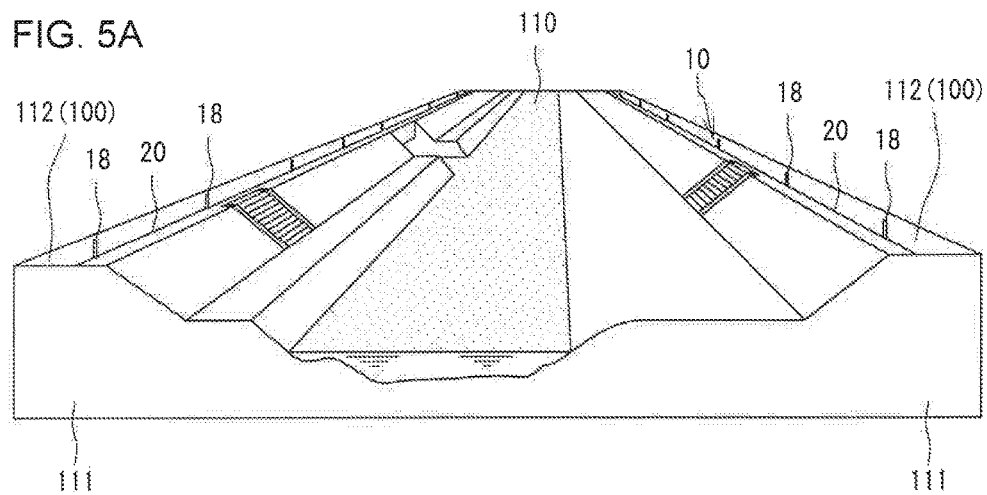
FIGS. 5A and 5B are diagrams showing an illumination system placed on a road which extends along a river.
Figure 5B:
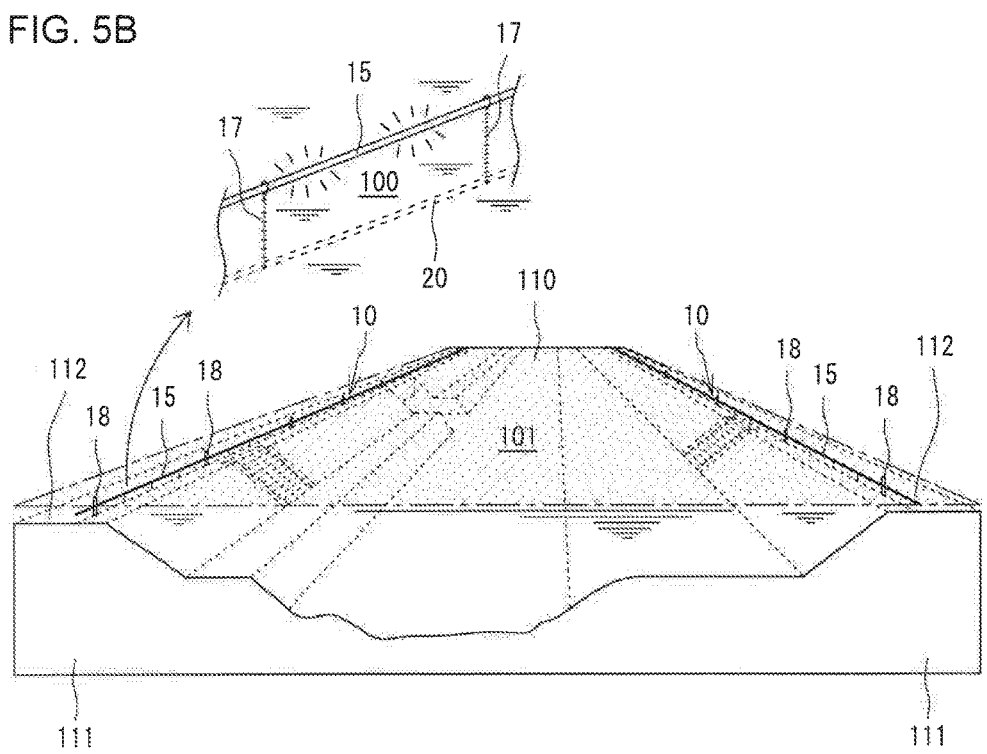

FIGS. 5A and 5B are diagrams showing the illumination system 10 which is placed at an edge of a bank road 112 provided on a bank 111 of a river 110, and near a boundary between the river 110 and the bank road 112. FIG. 5A shows normal operation when the road surface 100 of the bank road 112 is not submerged, and FIG. 5B shows a state where the river 110 is flooded and the road surface 100 of the bank road 112 is submerged. An inside of the bank 111 is the river 110.

The illumination system 10 applied to the bank road 112 and to a pier 121 to be described later may be lighted at all times, but is desirably lighted when the light guide tube 15 floats due to the submergence of the road surface 100 and when the surrounding environment becomes dark. In this case, the illumination system 10 comprises a sensor which detects floating of the light guide tube 15 and a luminosity sensor.

As exemplified in FIG. 5A, on the road surface 100 of the bank road 112, a plurality of support pillars 18 on which the light source devices 11 (not shown) are placed are placed in a standing manner with an approximate equal spacing along the boundary between the river 110 and the bank road 112. A plurality of light guide tubes 15 are provided connecting the support pillars 18 and along the boundary between the river 110 and the bank road 112. The receiving groove 20 is provided on the road surface 100, and the light guide tube 15 (intermediate portion 15b) is stored in the receiving groove 20 at the time of normal operation. A plurality of connection members 17 for connecting and retaining the light guide tube 15 on the road surface 100 are also stored, for example, in the recess 21 of the receiving groove 20.

As exemplified in FIG. 5B, when the river 110 is flooded and the bank road 112 is submerged, the light guide tube 15 stored in the receiving groove 20 floats on the water surface 101 and emits light. Because the light guide tube 15 is connected and retained on the road surface 100 by the connection member 17, the light guide tube 15 floating on the water surface 101 is not carried away, and is retained at the boundary between the river 110 and the bank road 112.

In other words, the light guide tube 15 which brightly emits light in a state of floating on the water surface 101 is placed along the boundary between the river 110 and the bank road 112. With such a configuration, the boundary between the river 110 and the bank road 112 can be clarified, and it is possible to prevent pedestrians and drivers of automobiles or the like falling in to the flooded river 110. When the water recedes from the road surface 100, the amount of floating of the light guide tube 15 is gradually reduced, and the light guide tube 15 finally returns to the inside of the receiving groove 20.

Figure 6A:
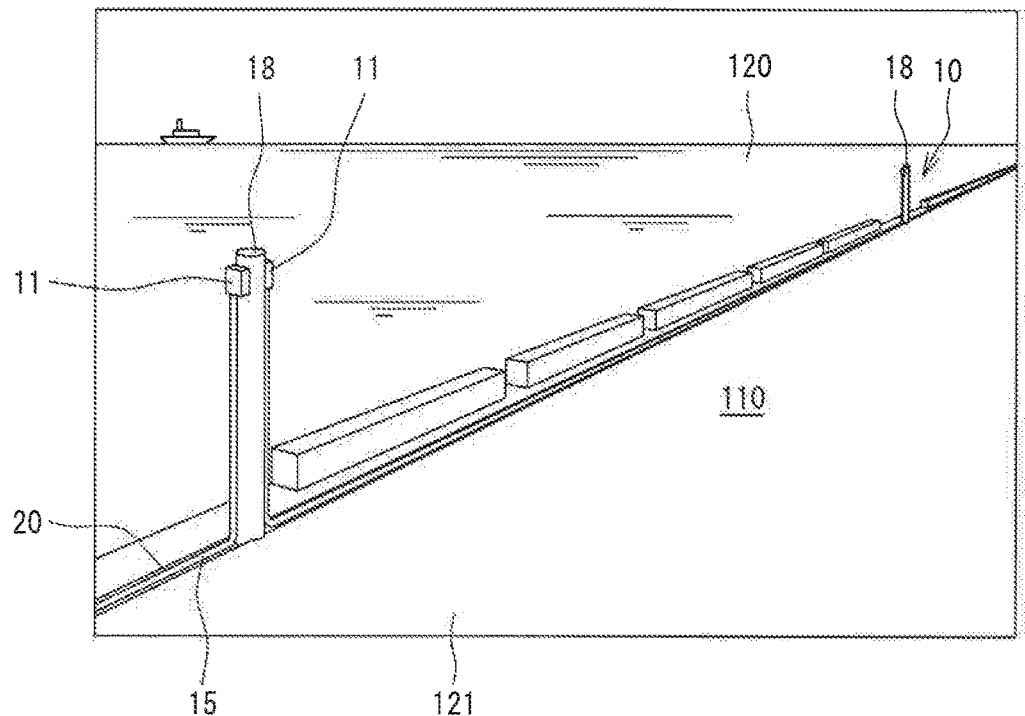
FIGS. 6A and 6B are diagrams showing an illumination system placed on a pier of a harbor.
Figure 6B:
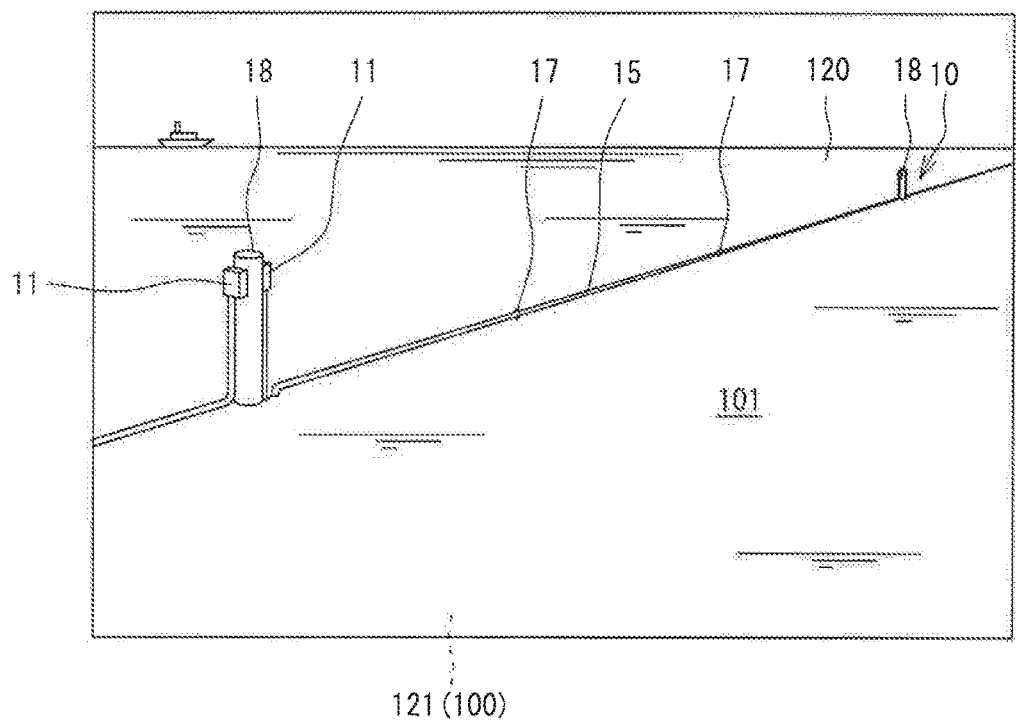

FIGS. 6A and 6B are diagrams showing the illumination system 10 placed at an edge of the pier 121 of a harbor, near and along a boundary between sea 120 and the pier 121. FIG. 6A shows normal operation where the road surface 100 of the pier 121 is not submerged, and FIG. 6B shows a state where the road surface 100 of the pier 121 is submerged due to high tide.

As exemplified in FIG. 6A, on the road surface 100 of the pier 121, a plurality of support pillars 18 on which the light source devices 11 are placed are provided in a standing manner with an approximately equal spacing along the boundary between the sea 120 and the pier 121, and the light guide tube 15 is provided extending in a manner to connect the support pillars 18. During normal operation, the light guide tube 15 is stored in the receiving groove 20 along with the connection member 17. On the other hand, as exemplified in FIG. 6B, when the road surface 100 of the pier 121 is submerged due to high tide, the light guide tube 15 stored in the receiving groove 20 floats on the water surface 101 and emits light. Thus, it becomes possible to easily view the boundary between the sea 120 and the pier 121, and to prevent pedestrians and drivers of the automobiles or the like falling into the sea 120.

Illumination systems 10A and 10B which are alternative configurations of the embodiment will now be described exemplifying FIGS. 7A, 7B, and 8. The illumination systems 10A and 10B differ from the illumination system 10 in that a structure for facilitating the returning of the floated light guide tube 15 into the receiving groove 20 when the water recedes from the road surface 100 is added. In the following description, a difference from the above-described embodiment will be primarily described, and constituting elements similar to those of the above-described embodiment will be referred to with the same reference numerals, and will not be repeatedly described.

Figure 7A:
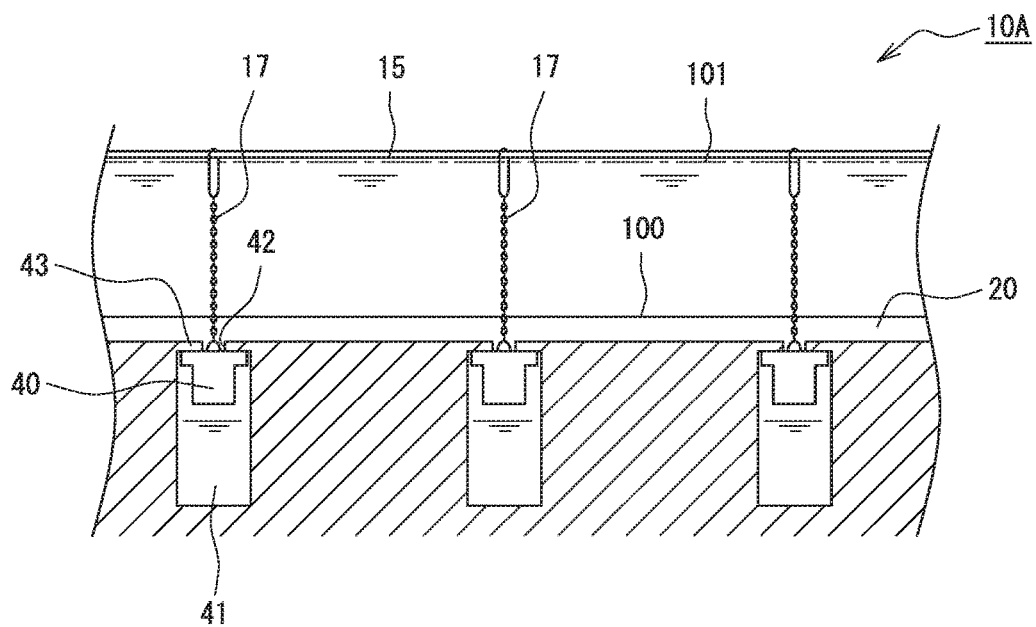
FIG. 7A is a diagram showing an illumination system according to another configuration of the embodiment of the present disclosure.
Figure 7B:
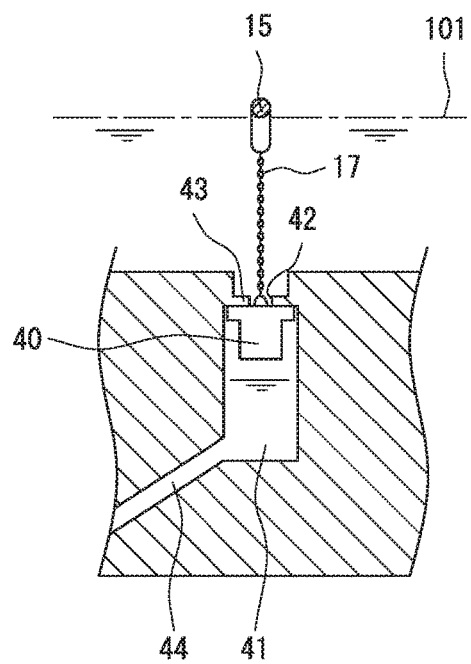
FIG. 7B is a diagram showing an illumination system according to another configuration of the embodiment of the present disclosure.

The illumination system 10A exemplified in FIGS. 7A and 7B differs from the illumination system 10 in that the illumination system 10A comprises a float member 40 which has a floating property to float in water and on which one end of the connection member 17 is fixed, and a receiving recess 41 of the float member 40, provided on the road surface 100. The illumination system 10A comprises the receiving groove 20 of the light guide tube 15. The receiving recess 41 has an opening 42 at the bottom of the receiving groove 20 through which the connection member 17 passes, and is formed vertically below the bottom. During the submergence of the road surface 100, water enters from the opening 42 into the receiving recess 41, and the float member 40 floats and sinks based on the amount of water entering the receiving recess 41.

The receiving recess 41 has a float stopper 43 which limits floating of the float member 40, and holds the float member 40 in a movable manner in a predetermined range. The float stopper 43 is formed around the opening 42, and prevents further floating of the float member 40. The float member 40 moves to the upper part of the receiving recess 41 during the submergence of the road surface 100, and is caught by the float stopper 43, for example, to prevent the light guide tube 15 being carried away. The float member 40 moves to the lower part of the receiving recess 41 when the water recedes from the road surface 100. With such a configuration, a force to pull the light guide tube 15 into the receiving groove 20 acts, and the light guide tube 15 is stored in the receiving groove 20.

The float member 40 may be fixed on a part of the connection members 17 or on all of the connection members 17. A plurality of the receiving recesses 41 which store the float members 40 are formed corresponding to the placement locations of the connection members 17, and may be formed vertically below the recess 21. The receiving recess 41 is formed elongated in the vertical direction, and is formed, for example, longer than the length of the connection member 17.

As exemplified in FIG. 7B, on the receiving recess 41, a water discharge channel 44 for discharging entered water is provided. The water discharge channel 44 is formed at the bottom or near the bottom of the receiving recess 41, and has a role to discharge water accumulated in the receiving recess 41. By providing the water discharge channel 44, it becomes possible to quickly move the float member 40 to the lower part of the receiving recess 41 when the water recedes from the road surface 100, and to quickly return the light guide tube 15 into the receiving groove 20.

Figure 8:
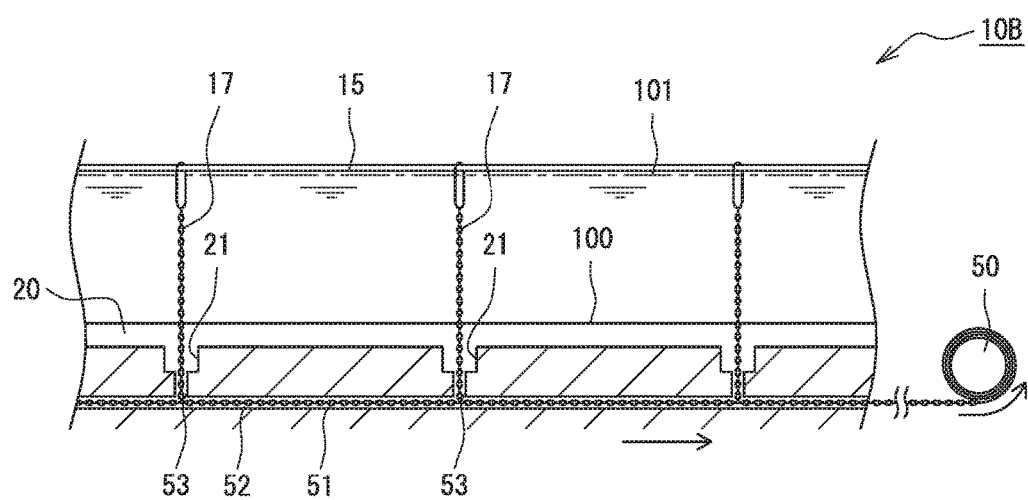
FIG. 8 is a diagram showing an illumination system according to another configuration of the embodiment of the present disclosure.

As exemplified in FIG. 8, the illumination system 10B differs from the illumination systems 10 and 10A in that the illumination system 10B comprises a winding machine 50 which winds the connection member 17. The winding machine 50 may be provided for all of the connection members 17, but is desirably provided every few connection members 17. In the illumination system 101, when the water recedes from the road surface 100, the winding machine 50 is driven to wind the connection member 17, so that the light guide tube 15 floating on the water surface 101 can be returned into the receiving groove 20. The winding machine 50 is desirably provided at a location which is not sub-merged during the submergence of the road surface 100, such as an upper part of the support pillar 18.

In the example configuration shown in FIG. 8, a cable 51 to which a plurality of the connection members 17 are connected, and an insertion path 52 through which the cable 51 is passed, are provided. With the cable 51 being wound by the winding machine 50, the connection member 17 is pulled to the side of the recess 21 of the receiving groove 20. The insertion path 52 is formed, for example, along the receiving groove 20, and vertically below the receiving groove 20. At a bottom of the recess 21, a connection path 53 connected to the insertion path 52 is formed. During the submergence of the road surface 100, for example, the cable 51 is drawn out from the winding machine 50 by a buoyant force acting on the light guide tube 15, and the light guide tube 15 floats on the water surface 101.

According to the configurations exemplified in FIGS. 7 and 8, during the submergence of the road surface 100, the boundary between the sea, the river, or the like and the road surface 100 can be easily viewed, and, when the water recedes from the road surface 100, the floated light guide tube 15 can easily return into the receiving groove 20.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:
1. An illumination system comprising:
   a solid-state light source;
   a wavelength conversion element that converts a wavelength of light emitted from the solid-state light source;
   a light guide tube that allows incoherent light emitted from the wavelength conversion element to propagate and transmit therethrough, and that has a floating property to float in water; and
   a connection member that connects and retains the light guide tube on a road surface or on a construction placed on the road surface while securing the floating property of the light guide tube.
2. The illumination system according to claim 1, further comprising a receiving groove of the light guide tube, provided on the road surface or on the construction.
3. The illumination system according to claim 2, wherein a recess for storing the connection member is provided in the receiving groove.
4. The illumination system according to claim 3, wherein
   a plurality of the connection members are provided with a spacing therebetween along a length direction of the light guide tube, and
   a plurality of the recesses are provided corresponding to placement locations of the connection members.
5. The illumination system according to claim 1, further comprising:
   a float member that has a floating property to float in water and to which a second end, of ends of the connection member, which is opposite from a first end to which the light guide tube is fixed, is fixed; and
   a receiving recess of the float member provided on the road surface or on the construction, wherein
   the float member floats and sinks according to an amount of water entering the receiving recess, and the receiving recess has a float stopper that limits floating of the float member, and holds the float member in a movable manner within a predetermined range.

6. The illumination system according to claim 5, wherein a water discharge channel for discharging entered water is provided on the receiving recess.

7. The illumination system according to claim 1, further comprising a winding machine that winds the connection member.

8. The illumination system according to claim 1, further comprising:
a plurality of support pillars placed with a spacing along a length direction of the light guide tube, wherein
the solid-state light source and the wavelength conversion element are placed on the support pillar, at a position higher than a maximum floating height of the light guide tube.

9. The illumination system according to claim 1, wherein two solid-state light sources and two wavelength conversion elements are provided for one light guide tube, and the incoherent light is introduced from both end surfaces of the light guide tube.

10. The illumination system according to claim 1, wherein the solid-state light source is a semiconductor laser that outputs a near-ultraviolet ray or blue light.

11. The illumination system according to claim 1, wherein the light guide tube comprises a core and a clad.

12. The illumination system according to claim 1, wherein the light guide tube is placed on a road which extends along a bank of a river.

13. The illumination system according to claim 1, wherein the light guide tube is placed on a pier of a harbor.

* * * * *